United States Patent Office 2,830,933
Patented Apr. 15, 1958

2,830,933

VITAMIN $B_{12}$ PRODUCTS AND PREPARATION THEREOF

Edward F. Bouchard, West Islip, Ira J. Friedman, Hicksville, and Roy J. Taylor, Flushing, N. Y., assignors to Chas. Pfizer & Co., Inc., Brooklyn, N. Y., a corporation of Delaware No Drawing. Application July 14, 1955
Serial No. 522,173

6 Claims. (Cl. 167—81)

This invention is concerned with vitamin products. In particular, it is concerned with products containing vitamin $B_{12}$ in a particularly stable, highly useful, dry form together with therapeutically valuable or nutritionally valuable materials which normally are very deleterious to vitamin $B_{12}$.

It has been found that vitamin $B_{12}$ adsorbed on cation ion exchange resins has unusual stability, particularly under acid conditions and even in the presence of materials normally deleterious to the vitamin. Formation of various pharmaceutical dosage forms containing this type of vitamin product, even with materials which normally are very deleterious to vitamin $B_{12}$, results in products of surprising stability. Such deleterious materials include, in particular, ascorbic acid, ferrous iron and other substances of this nature which are primarily reducing agents. In addition the vitamin in this form is particularly well absorbed when administered orally to animals, including humans, and seems to have a definitely prolonged effect in the body.

It should be noted that when reference is made herein to "vitamin $B_{12}$" or "vitamin $B_{12}$ activity," these terms are meant to include not only vitamin $B_{12}$ itself or cyanocobalamine, but also various other forms of the vitamin, such as hydroxycobalamine. It has been found that this last form of the vitamin either in crude or pure form is particularly well adapted for the present composition.

In preparing the products of the present invention, vitamin $B_{12}$ in various forms, such as Streptomyces fermentation broths, or preferably the pure vitamin ($B_{12}$, $B_{12b}$, etc.), or partially purified concentrates of the vitamin, are contacted in the form of aqueous solutions with a cation-exchange resin of a suitable low toxicity at an acid to neutral pH. In general, contact is made at pH's ranging from about 2 to about 6. The concentrates of vitamin $B_{12}$ used for the manufacture of the present products may have activity of from about 1000 micrograms per gram up to the potency of the pure crystalline compound, that is, 1,000,000 micrograms per gram for cyanocobalamine ($B_{12}$) itself. The concentration of the vitamin used may range from about 100 micrograms per milliliter to 100,000 micrograms per milliliter or more.

In operating the process for the preparation of the products of the present invention, the chosen resin is contacted with the aqueous vitamin solution at about room temperature, that is, from about 15° to about 25° C. (although higher or lower temperatures are not deleterious) utilizing sufficient resin to adsorb a major part of the vitamin. Often under the best conditions as much as 1.5 grams of vitamin $B_{12}$ activity is adsorbed on each gram of one of the more effective resins. However, this depends upon the purity of the vitamin $B_{12}$ product used, the concentration of the solution, temperature, the nature of the resin, the pH and other factors.

A variety of cation-exchange resins may be utilized for the preparation of the products of the present invention. In general, as noted above, these should be non-toxic, since they are to be administered orally together with the vitamin. However, since a very small weight of resin is capable of adsorbing sufficient vitamin for a therapeutically effective or nutritionally effective dose of the vitamin, this is not a major problem. Cation-exchange resins in which the major part of the exchanging groups are carboxyls are particularly favored. Resins which are polyacrylic acid or polymethacrylic acid in which the molecules are cross-linked with divinyl aromatic compounds, such as divinylbenzene, may be used. Preparation of such resins are described in copending patent application Serial No. 288,951, filed on May 20, 1952, by Edwin N. Lightfoot, Jr. A number of these resins are available commercially, particularly from the Rohm & Haas Company under the name "Amberlites," e. g. Amberlite IRC–50, Amberlite XE–89 and so forth. Certain other ion-exchange resins containing sulfonic acid groups are also useful. These include such materials as Dowex 50 (available from Dow Chemical Co.) which are sulfonated polystyrene compounds cross-linked with a divinyl aromatic compound such as divinylbenzene.

In the adsorption of vitamin $B_{12}$ upon ion-exchange resins, the presence of inactive materials in the aqueous solution used as starting material may materially affect the proportion of vitamin adsorbed. This is particularly true when water-soluble inorganic salts are present. This tends to appreciably decrease the proportion of vitamin adsorbed on the resin. Also, it has been found that the presence of salt tends to decrease the pH range over which the resins may be used effectively in the adsorption of the vitamin. Thus, in the presence of salt, the effective range for adsorption of the vitamin is from about 2 to about 6, whereas it is possible to use a somewhat higher range, that is, pH 1 to pH 7, when no salts are present. Furthermore, various biologically active forms of vitamin $B_{12}$ differ in their sensitivity to the presence of salt. Thus, in the presence of 1% of sodium sulfate in an aqueous solution, vitamin $B_{12}$ is adsorbed to a very limited extent above pH 5, whereas vitamin $B_{12b}$ or hydroxycobalamine is strongly adsorbed even at pH 6. As the concentration of the salt is increased, it is necessary to use lower and lower pH's in order to achieve a practical adsorption of the vitamin on the resin.

It has been found that the products of the present invention, that is, adsorbates of vitamin $B_{12}$-active materials on a synthetic cation-exchange resin, may be incorporated into dosage forms even with materials which ordinarily are very destructive of vitamin $B_{12}$ activity and yet this activity is retained to a great extent due to the stable nature of the present products. In particular, reference is made to incorporation of the vitamin $B_{12}$-containing materials with agents such as ascorbic acid, various ferrous salts and other reducing materials of this nature which tend to be very destructive of the vitamin activity. All of these materials are referred to as vitamin composition components.

The resin adsorbates of this invention are particularly useful when blended with multivitamin and multimineral components, that is, useful forms of thiamin, riboflavin, pyridoxine, pantothenic acid, manganese, zinc, iodine, copper and so forth. This is particularly true when the compositions contain ascorbic acid or an ascorbate and/or a ferrous salt.

The vitamin adsorbates may be incorporated with suitable excipients, such as flavoring agents, sweetening agents, binders, and other materials of this type. The compositions may be packaged in capsules or these materials, with a suitable binding agent, may be prepared in the form of tablets. Various natural and synthetic gums serve well as binding agents for tablets. Furthermore, the products of the present invention may be incorporated in suspensions for oral administration. Such suspensions in which the vitamin-resin product must be prepared in the form of very finely divided particles may also contain suspending agents, wetting agents and various flavoring and sweetening agents. The resin product containing the vitamin may be finely ground or the resin itself may be ground before adsorption of the vitamin.

The products of the present invention have certain definite advantages when administered to patients or to animals requiring such treatment. The vitamin adsorbed on the resin is appreciably protected from the action of the acid gastric juices and passes practically unchanged through the gastric system into the intestinal tract which, having a higher pH, is effective in removing the vitamin from adsorption on the resin, and the vitamin is thereupon adsorbed into the system at its normal site in the intestine.

The following examples are given by way of illustration and are not to be regarded as limitations of this invention, many variations of which are possible without departing from the spirit or scope thereof.

*Example I*

Amberlite IRC-50 ion-exchange resin in acid form was washed with water, dried at 100° C. and ground to a fine powder. Material passing a 200-mesh screen was separated for use. 470 milliliters of a solution containing vitamin $B_{12}$ activity at a concentration of 350 mcg./ml. was prepared. This material, consisting of approximately 90% vitamin $B_{12b}$ and 10% vitamin $B_{12}$ based on the activity present, had a potency of approximately 100,000 γ/gram on a dry basis. To the aqueous solution was added 150 grams of the powdered resin. The mixture was stirred for 20 minutes and the resin was filtered, washed with a small volume of water and dried at 50° C. Practically all of the vitamin $B_{12}$ activity had been removed from the solution. The dried pink resin adsorbate was found to have an activity equivalent to 890 micrograms of vitamin $B_{12}$ per gram.

This product was exposed to synthetic gastric juice (1.4 grams sodium chloride, 0.5 gram potassium chloride, 0.06 gram calcium chloride, 6.94 grams of 36% hydrochloric acid and 3.2 grams of pepsin diluted to one liter) for 4 hours at 98.6° F. utilizing 2 grams of the resin adsorbate and 200 milliters of solution. Less than 10% of the total vitamin $B_{12}$ activity was removed from the resin by this treatment. More than 90% of the activity was retained. Upon exposure of the same product at 98.6° F. to a synthetic intestinal juice prepared from sodium bicarbonate and pancreatin in water for one-half hour, practically all of the vitamin $B_{12}$ was removed. This demonstrates the stability of the vitamin-resin product under conditions occurring in the stomach and the ease with which the product is eluted under conditions occurring in the intestine.

*Example II*

6.88 grams of vitamin $B_{12}$ resin adsorbate prepared according to the process of Example I, 7.5 grams of ascorbic acid, 17.82 grams of sucrose, 14.62 grams of lactose and 3.56 grams of corn starch were blended dry. To this mixture was added 4.5 milliliters of a 10% gum acacia solution. The mixture was blended and granulated. The granules were dried at 120° C. This product was readily formed into tablets containing the vitamin $B_{12}$ in a highly stable form. A similar product was prepared utilizing vitamin $B_{12}$ diluted with dicalcium phosphate, a commercially available product. When the granular products were compared for stability to heat, it was found that the material prepared from the resin adsorbate retained a high proportion of its total activity even after four weeks at 50° C., whereas the granules prepared with the commercially available vitamin $B_{12}$ product retained less than 5% of the total activity during this period.

*Example III*

A vitamin-mineral composition was prepared by thoroughly blending together the following materials: vitamin A in the form of gelatin beadlets containing the crystalline vitamin A acetate 5 million units, vitamin D 500,000 units, thiamin hydrochloride 3 grams, riboflavin 3 grams, pyridoxine hydrochloride .5 gram, niacinamide 25 grams, ascorbic acid 50 grams, calcium pantothenate 5 grams, a mixture of tocopherols 5 grams, vitamin $B_{12}$ adsorbed on a carboxylic acid cation exchange resin 1 milligram of activity, cobalt in the form of cobalt nitrate 0.1 gram, copper in the form of the sulfate 1 gram, iron in the form of the sulfate 10 grams, iodine 0.15 gram, calcium in the form of the carbonate 213 grams, manganese in the form of the sulfate 1 gram, magnesium in the form of the sulfate 6 grams, molybdenum in the form of sodium molybdenate 0.2 gram, phosphorus in the form of disodium acid phosphate 165 grams, potassium in the form of the chloride 5 grams, zinc in the form of the sulfate 1.2 grams. This material was thoroughly blended and the mixture was made up in hard gelatin capsules utilizing for each one-thousandth of the total weight of the composition. It was found that this material retained its vitamin $B_{12}$ potency for an extended period of time despite the presence of ascorbic acid and other materials known to be deleterious to most preparations of vitamin $B_{12}$.

*Example IV*

A composition was prepared from the following materials: 10 milligrams of vitamin $B_{12}$ activity in the form of a carboxylic acid ion exchange resin adsorbate of the active material, 10 grams of vitamin $B_1$ (thiamin chloride hydrochloride), 10 grams of riboflavin, 50 grams of niacinamide, 5 grams of calcium pantothenate, 4.5 grains of desiccated whole liver, 1980 grams of iron in the form of the reduced metallic powder. These materials were thoroughly blended and packed in hard gelatin capsules each containing a mixture with one microgram of vitamin $B_{12}$ activity. This composition proved highly effective as a hematinic and the activity of the vitamin $B_{12}$ was retained to a very excellent extent throughout storage.

*Example V*

Ten milligrams of vitamin $B_{12}$ activity in the form of a resin adsorbate was mixed with the following materials: .5 gram of folic acid, 50 grams of ascorbic acid, 50 grams of desiccated stomach substance, 150 grams of whole dry liver preparation, 100 grams of ferrous sulfate exsiccated. This material was thoroughly blended in the dry state, packed into capsules, each capsule containing the equivalent of 10 micrograms of vitamin $B_{12}$. This material, despite the presence of the ascorbic acid, proved to be a highly stable vitamin $B_{12}$ preperation and excellent for use as a hematinic for treatment of patients having various forms of anemia.

What is claimed is:

1. A vitamin $B_{12}$ composition containing vitamin composition components normally deleterious to vitamin $B_{12}$ wherein the vitamin $B_{12}$ is present as an adsorbate on a synthetic cation exchange resin of low toxicity.

2. The composition of claim 1 wherein the composition contains ascorbic acid.

3. The composition of claim 1 wherein the composition contains a ferrous salt.

4. A process which comprises contacting a vitamin $B_{12}$ containing aqueous solution with a synthetic cation exchange resin, removing the resin adsorbate from the aqueous solution, drying the resin adsorbate and blending it with vitamin composition components at least one of which is normally deleterious to vitamin $B_{12}$.

5. The process of claim 4 wherein the dried vitamin $B_{12}$-resin adsorbate is blended with multivitamin-multimineral components including at least one ingredient of the group consisting of ascorbic acid, an ascorbate and a ferrous salt.

6. A multivitamin composition including vitamin $B_{12}$ adsorbed on a synthetic cation exchange resin and at least one substance of the group consisting of ascorbic acid, an ascorbate and a ferrous salt.

References Cited in the file of this patent

UNITED STATES PATENTS

| 2,628,186 | Shive | Feb. 10, 1953 |
| 2,684,322 | Colovos | July 20, 1954 |
| 2,721,827 | Gustus | Oct. 25, 1955 |

OTHER REFERENCES

Modern Drug Encycl., 5th ed., 1952, p. 1058.